United States Patent Office 3,358,421
Patented Dec. 19, 1967

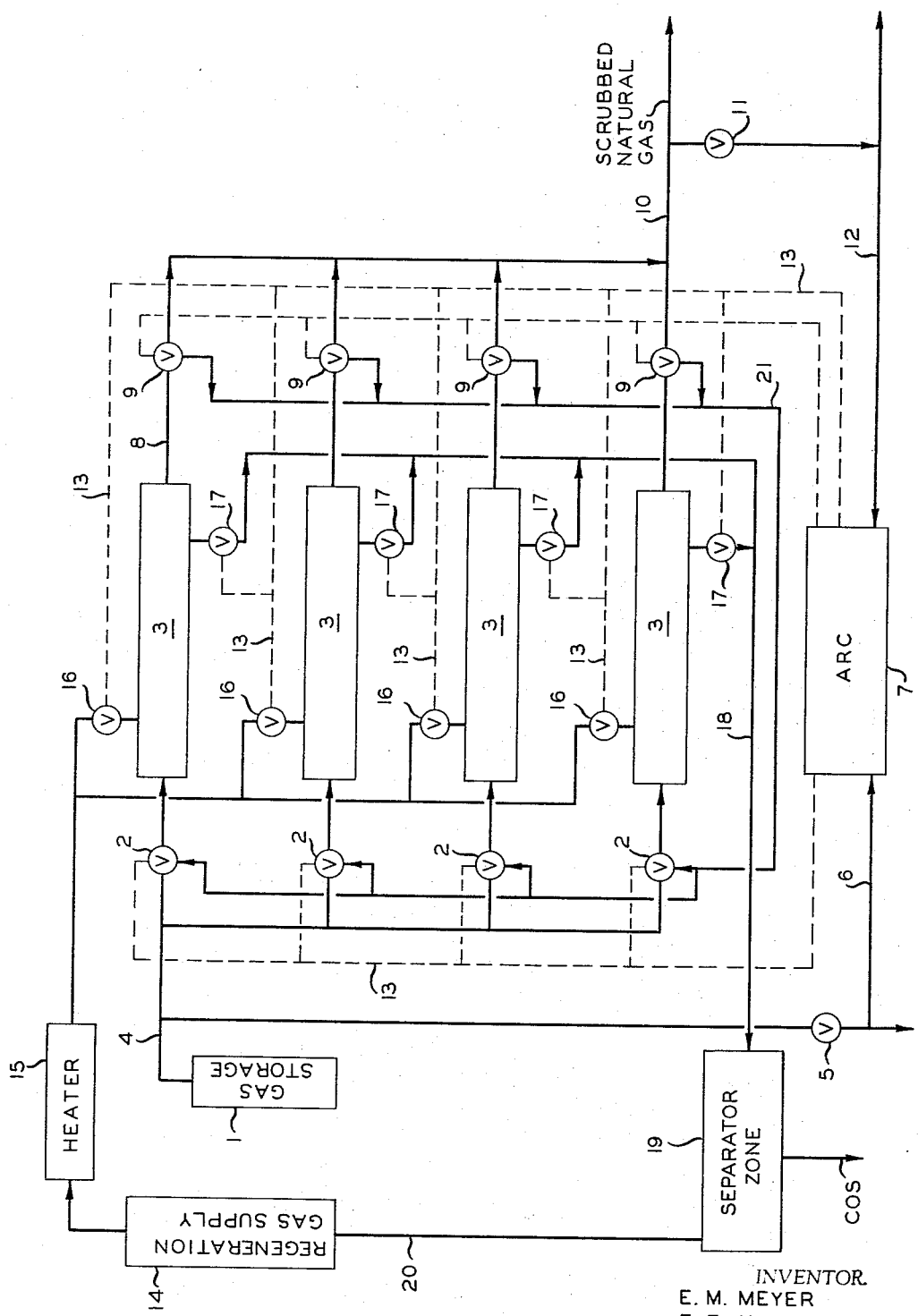

3,358,421
REMOVAL OF CARBONYL SULFIDES FROM HYDROCARBON FLUIDS
Edward E. Huxley and Earl M. Meyer, Pasadena, Tex., assignors to Phillips Petroleum Company, a corporation of Delaware
Filed Oct. 29, 1964, Ser. No. 407,473
11 Claims. (Cl. 55—19)

This invention relates to the treatment of hydrocarbon fluids. In one of its aspects this invention relates to the removal of undesirable elements from hydrocarbon fluids. In another of its aspects, the invention relates to the removal of carbonyl sulfide from hydrocarbon fluids by the use of a molecular sieve. A still further aspect of this invention relates to the regeneration of the molecular sieves used to remove carbonyl sulfide from hydrocarbon fluids. In another of its aspect the invention relates to the analysis of natural gas to determine the presence of carbonyl sulfide and a control system for using molecular sieves based on the analysis of the quantity of carbonyl sulfide in the natural gas stream. Still another of the aspects of this invention relates to the removal of carbonyl sulfide from a hydrocarbon fluid containing carbon dioxide and carbonyl sulfide.

The removal of sulfur components from hydrocarbon fluid streams and particularly natural gas streams is extremely important to industry for several reasons. The presence of sulfur-containing compounds in such streams may result in the deposition of sulfur-containing compounds which can cause plugging and corrosion of transmission pipes, valves, regulators, and the like. Also the sulfur compounds may produce undersirable side reactions with other materials contacting the stream. Due to an increased demand for natural gas, in recent years there has been an ever increasing use of "sour" gas fields. Since the "sour" gases contain many sulfur-containing compounds, it is therefore necessary to remove the sulfur-containing compounds prior to subsequent use. Several conventional methods for removing hydrogen sulfide from hydrocarbon fluids and for converting mercaptans to less obnoxious form have been developed. However, carbonyl sulfide, being relatively inert, is not satisfactorily removed by conventional treating processes employed by the industry for the removal of hydrogen sulfide, mercaptans and the like. In a prior art method for the removal of carbonyl sulfide, natural gas, containing a carbonyl sulfide, is brought into contact with adsorbent reagents impregnated with monoethaenolamine or with alkylene polyamines, or in general with organic bases having at least one primary amine group. In this method of removal a reaction takes place by which carbonyl sulfide is removed from the natural gas in the form of an oil insoluble compound. However, a considerable disadvantage exists in these and other prior art methods when a high carbon dioxide content is found in the natural gas. Without going extensively into the reasons, it has been found that the presence of a high carbon dioxide content in natural gas will, to some extent, render extremely difficult a process for the removal of carbonyl sulfide. We have now developed a method whereby the removal of carbonyl sulfide in a natural gas stream containing high carbon dioxide content can be effected.

An object of this invention is to provide a method of removing impurities from a hydrocarbon fluid stream. A further object of this invention is to provide a method for the removal of carbonyl sulfide from a natural gas stream. A still further object of this invention is to provide an effective way to remove carbonyl sulfide from a natural gas stream containing carbon dioxide. Further, an object of this invention is to provide a control means for the removal of impurities from hydrocarbon fluids. A still further object of this invention is to provide a method for the regeneration of molecular sieves so that they may be used again in the process.

Other aspects, objects, and the several advantages of this invention are apparent from a study of this disclosure, the drawing and the appended claims.

According to this invention there is provided a method of removing carbonyl sulfide from hydrocarbon fluids by passing the fluid through a molecular sieve. Also, according to this invention, there is provided a process of treating natural gas for the removal of carbonyl sulfide comprising, passing the natural gas which contains carbonyl sulfide through a molecular sieve of the proper pore size to remove the carbonyl sulfide from the natural gas.

Further, according to the practice of this invention, there is provided a method for removing carbonyl sulfide from natural gas which also contains carbon dioxide by passing the natural gas containing carbonyl sulfide through a molecular sieve wherein the average pore opening is about 3 Angstrom units and wherein the carbonyl sulfide will be adsorbed from the natural gas. The treated natural gas is then ready for use in other processes. When the molecular sieve adsorbent has become spent, that is, it will no longer adsorb carbonyl sulfide, the natural gas stream is diverted from it and the sieve is regenerated by passing through the sieve a regenerating fluid, which will be hereinafter discussed, to remove the adsorbed carbonyl sulfide therefrom.

Still, further according to the invention, there are provided apparatus means for carrying out the method comprising in combination a natural gas storage tank, a plurality of molecular sieves, regeneration gas supply means, heater means for the gas supplied from the regeneration gas supply means, separator zone means for the removal of carbonyl sulfide from the regenerated gas, a plurality of valve means responsive to controls based upon the chromatographic analysis of the natural gas at various points in the apparatus, and said valve means capable of connecting individul molecular sieves in series or connecting an individual molecular sieve means to said regenerated gas supply means, or alternatively, to the gas storage means, and chromatographic analysis means whereby the removal of carbonyl sulfide and the regeneration of the molecular sieves can be controlled.

In accordance with the present invention, we have found that carbonyl sulfide can be selectively removed from a natural gas containing carbonyl sulfide and carbon dioxide by passing the natural gas through a molecular sieve having an average pore diameter of about 3 Angstrom units. It has been found that while the molecular sieve will adsorb and retain the carbonyl sulfide, the carbon dioxide in the natural gas will pass with the natural gas through the sieve bed. It has also been found that substantially complete carbonyl sulfide removal from the natural gas may be effected in this way. The carbonyl sulfide adsorption is believed to be due to the crystal structure of the molecular sieves. Since molecular sieves are generally synthetically produced zeolite crystals of metal alumino-silicates, they will contain a substantial amount of water of hydration. When the water of hydration is driven off the crystal does not collapse or rearrange as is the case with most hydrated materials. Instead, the physical structure of the crystal remains unchanged which results in a network of empty pores and cavities that comprise about one half of the total volume of the crystals. The water of hydration may be driven off by heating the sieve to any suitable temperature, preferably in the range of about 300° F. to 600° F. The theoretical pore diameter is formed by a framework of silica alumina tetrahedra as found in molecular sieves and can be somewhat greater than the effective pore diameter which is determined by the cation in its position in the structure. Therefore, it is seen that a 3 Angstrom molecular sieve such as potassium zeolite will permit only molecules smaller than about 3 Angstroms to enter the cavities and be adsorbed. This is believed to be the theoretical basis for the adsorption of carbonyl sulfide in the instant invention.

A zeolite which has been found to be useful in the process of this invention is potassium zeolite which may be formed through ion exchange of about 75 percent of the sodium ions in a sodium zeolite. This ion exchange may be effected by contacting sodium zeolite with a water solution of potassium chloride wherein the potassium ions are substituted for the sodium ions. As has already been discussed, the pore size of a particular crystalline zeolite is determined by the metal cation that it contains. Of the zeolites found applicable for use in the process of this invention, potassium zeolite was found to be particularly useful. However, other zeolites may be useful providing that the metal cation provides a sufficiently small pore size diameter. Although it has been found that for common adsorbents such as charcoal or silica gel, the adsorption selectivity is based primarily on the boiling point or critical temperature of the material to be adsorbed, activated zeolite molecular sieves appear to exhibit a selectivity based on the size and shape of the molecule of the material to be adsorbed. It is believed in part that this factor is accountable for the adsorption of carbonyl sulfide. Although this is believed to be the theory upon which the adsorption of carbonyl sulfide in a 3 Angstrom molecular sieve is based, applicants do not wish to be bound by this theory since this is only an explanation of the results obtained.

Prior to use in the adsorption of carbonyl sulfide from natural gas the molecular sieves used are treated by heating to remove the water of hydration, which heating has been previously discussed, renders the pores of the molecular sieve capable of adsorbing carbonyl sulfide. Alternatively, the molecular sieve adsorbent materials of the present invention may be rendered capable of adsorbing carbonyl sulfide by purging with an inert gas, for example nitrogen, or by the use of hydrogen. This latter method is the method used for regeneration of the molecular sieves. It is sometimes preferable to use pressure during the regeneration or preparation of the molecular sieve materials. The regeneration of adsorbent materials can be carried out by using hydrogen from a catalytic reforming operation at any suitable pressure, however, it is generally preferred to carry out the regeneration at approximately system pressure such as used in a catalytic reforming operation, for example, which usually ranges from about 400 to about 1000 p.s.i.g. If hydrogen is employed to regenerate the molecular sieve material, the regeneration temperature ranging from about 300 to about 600° F., preferably 350 to 450° F., may be utilized. Prior to its use in the removal of carbonyl sulfide from natural gas, it may be found useful to heat the molecular sieve material. If this is done, an elevated temperature in the range of 375° F. to 750° F. may be used for a period of twelve to twenty hours. The preferred range is from 460–540° F. for 15–17 hours.

The process conditions employed for contacting the sulfur-containing hydrocarbon fractions with the molecular sieves of the present invention may vary considerably. A contacting temperature ranging from about 70 to about 200° F., preferably about 100 to about 120° F., a contacting pressure ranging from atmospheric to about 600 p.s.i.g., and volumes of hydrocarbon charge per volume of sieve ranging from about 0.5 to about 5.0 volumes, preferably 0.8 to 1.2 volumes, can be advantageously employed.

As previously indicated, when the molecular sieve adsorbent in the adsorption zone has been used to remove carbonyl sulfide from natural gas for a period of time, it may become spent, that is, it will no longer adsorb carbonyl sulfide. When this occurs, the natural gas stream may be diverted from the molecular sieve and regenerating gas may be cycled through the molecular sieve to desorb or remove the adsorbed carbonyl sulfide therefrom. The regenerating gas with the desorbed carbonyl sulfide may then be introduced into a suitable conventional sulfur removal zone where the carbonyl sulfide may be removed and the regenerating gas recycled to regenerate another spent molecular sieve. As previously indicated, inert gases or hydrogen may also be used to regenerate the spent molecular sieves, in which case the desorbed carbonyl sulfide will be removed from the inert gases in a manner similar to that for removal of carbonyl sulfide from hydrogen.

It has been found that among the useful methods for determining the carbonyl sulfide content of a natural gas in accordance with the process of this invention, that chromatographic analysis may be highly advantageous in order to arrive at optimum time conditions for the use of each molecular sieve. We have in accordance with the practice of our invention included chromatographic analyzer system to ascertain the amount of carbonyl sulfide present in the natural gas at various points in the process and to control the selection and recycling of the various molecular sieves used in the process. Chromatographic analyzers such as the ones used in the practice of our invention, as described hereinafter, are well known in the art and require no other specification to those skilled in the art than their function of the context of this invention. Although chromatographic analysis is preferred, other methods of analysis well known in the art may be used.

The invention will be more fully explained and understood by referring to the accompanying drawing. It will be understood that the drawing is diagrammatic in feature and is included for illustrative purposes only. Conventional apparatus such as pumps, heat exchangers, and control instruments, etc., have, for the most part, been omitted for the sake of simplicity. The use of such equipment, however, is within the scope of the invention.

Referring now to the drawing, natural gas is stored in gas storage tank 1. Although a gas storage tank is shown, natural gas containing carbonyl sulfide may be provided for the system from any conventional source such as from pipe lines, directly from a well, etc. Natural gas from storage tank 1 is passed through suitable conduits to valves 2, and thence through adsorbing means 3 containing molecular sieves. Conduit 4, through which the natural gas is passed, has a valve 5 attached thereto through which a sample of the gas can be taken and transferred by conduit 6 to the chromatographic analyzer 7. The natural gas which is passed through conduit 4 to the adsorbing means 3 passes through one or any number of the valves 2 to the corresponding adsorbing means 3 as is desired in accordance with the practice of this invention. The adsorbing means 3 consist basically of a tubular or cylindrical body containing zeolite molecular sieve material as hereinbefore described. The carbonyl sulfide contained in the natural gas is removed by the adsorbing means 3 and the cleansed natural gas with the carbonyl sulfide removed therefrom is passed through conduit 8 through valves 9 to conduit 10. Valve 11 may be used to remove a sample of the cleansed natural gas where it is taken through conduit 12 to chromatographic analyzer 7. The natural gas samples which are taken from the natural gas conduits 4 and 8 through valves 5 and 11 respectively, are analyzed in the chromatographic analyzer 7. Based upon the chromatographic analysis of the gas samples, control of valves 2 and 9 is maintained so as to facilitate the removal of carbonyl sulfide from the natural gas stream. This control is accomplished by means well known to those skilled in the art, and for simplicity is not shown on the drawing other than by the use of dotted lines 13. When the particular adsorbing means 3 which is being used to remove the carbonyl sulfide from the natural gas is spent, that is, when the molecular sieve material will no longer remove carbonyl sulfide from the natural gas passing through the stream as determined by chromatographic analysis of the samples, the adsorbing means 3 is regenerated. Regeneration gas, which may be hydrogen or an inert gas as hereinbefore defined is supplied by regeneration gas supply means 14. The regenerating or desorbing gas is then passed through heater 15 through valve 16 to molecular sieve 3. Exiting gas carrying the desorbed carbonyl sulfide passes through valve 17 to conduit 18 and separator zone 19. In separator zone 19 carbonyl sulfide is removed from the desorbing or regenerating gas by conventional means well known to those skilled in the art. Cleansed regeneration gas is then passed through conduit 20 back to regeneration gas supply means 14 where it may be stored for further use in regenerating and desorbing the adsorbing means 3.

Conduit 21 is provided for the recirculation of the treated natural gas or for connecting in series one or more of the adsorbing means as desired and as will be hereinafter described.

In actual operation, the apparatus shown in the drawing can work as follows. Input to the molecular sieves 3 is controlled by valves 2, although only one of the valves 2 may be opened for any run of natural gas through the system, two or more may be opened if desired, depending upon the time required for a particular molecular sieve to become spent and the time required to desorb the carbonyl sulfide from the particular adsorbing means. In one mode of operation the apparatus shown can be used with initially only one of the valves 2 open, thereby allowing the entire natural gas stream charged to the system to pass through a single molecular sieve 3. The outlet valve 9 for the adsorbing means 3 that is used is opened and the cleansed gas is allowed to pass through conduit 10. As the length of time during which the adsorbing means 3 has been used increases, it may be indicated from the chromatographic analysis of the natural gas sampled from line 10 by use of valve 11 that the sieve is becoming substantially spent, whereby controls indicated only by 13 would be actuated to close the valve 2 to allow the regenerating gas to be fed to the spent adsorbing means 3 and to open another of the valves 2 to allow diversion of the natural gas stream through a fresh adsorbing means 3. Alternatively, depending upon the analysis of the natural gas sample in chromatographic analyzer 7, valve 9 would be opened to allow recycle of the partially cleansed natural gas through conduit 21 back through valve 2 and through molecular sieve 3. Still another variation, valve 9 could be opened to allow natural gas to be circulated back to valve 2 of a second adsorbing means thereby connecting two adsorbing means 3 in series. It will be apparent that the foregoing are only illustrations of the many variations in operation of the described apparatus that could be accomplished. The molecular sieves could be connected in series when the regenerating or desorbing gas was passed through the sieves. Although only four adsorbing means 3 have been shown, a greater or lesser number may be used.

The following example will serve to illustrate this specific application of our invention, however, the example is presented for the purpose of illustration only and should not be construed as a limitation.

*Specific example*

Natural gas, which contained carbonyl sulfide and carbon dioxide and which was to be used in ammonia plant streams, was treated by passing it through a molecular sieve. A molecular sieve with an average pore size diameter of approximately 3 Angstrom units was used. The sieve material was placed in a column 8' high x ¼" in diameter. The column and the sieve material were conditioned at a temperature of about 500° F. for approximately 16 hours. The sieve thus prepared was then used in the purification of natural gas. The natural gas was continuously passed through the molecular sieve. Chromatographic analysis of the natural gas stream before it passed through the molecular sieve indicated that approximately 1500 parts per million of carbonyl sulfide were present. In passing through the molecular sieve, subsequent chromatographic analysis of the natural gas indicated there was substantially no carbonyl sulfide present. Subsequent testing of the natural gas which had passed through the molecular sieve indicated that the carbon dioxide present in the natural gas remained.

Reasonable variation and modification are possible within the scope of the foregoing disclosure, the drawing and the appended claims to the invention, the essence of which is that there has been provided a method and apparatus for the removal of carbonyl sulfide from natural gas by the use of molecular sieves wherein there is also provided a method for the regeneration and desorption of the spent sieves. It also is believed to be apparent from the foregoing that the carbonyl sulfide removed from natural gas and the process therefore in dependent upon the selection of a molecular sieve material having a proper average pore diameter.

As will be evident to those skilled in the art, various other modifications to the invention can be made in view of the above disclosure and discussion without departing from the spirit or scope of the invention.

We claim:

1. A process for the removal of carbonyl sulfide from natural gas comprising passing the natural gas through a molecular sieve having an average pore diameter of about 3 Angstrom units to adsorb said carbonyl sulfide.

2. A process for the removal of carbonyl sulfide from natural gas which contains both carbonyl sulfide and carbon dioxide comprising passing the natural gas through a molecular sieve having an average pore diameter of about 3 Angstrom units to adsorb said carbonyl sulfide from said natural gas and said carbon dioxide.

3. A process for the removal of carbonyl sulfide from natural gas comprising heating the molecular sieve consisting of potassium zeolite and sodium zeolite in a ratio of 3:1 at a temperature and for a time sufficient to remove the water of hydration from said molecular sieve and then passing said carbonyl sulfide-containing natural gas through said sieve.

4. A process for the removal of carbonyl sulfide from natural gas containing carbonyl sulfide and $CO_2$ comprising heating a molecular sieve having openings of about 3 Angstrom units to a temperature of about 500° F. for about 16 hours, passing the natural gas through the sieve to adsorb said carbonyl sulfide and render said natural gas stream substantially free of carbonyl sulfide.

5. A continuous process for the removal of carbonyl sulfide from natural gas comprising passing said gas through a molecular sieve wherein the average pore diameter is about 3 Angstrom units, desorbing carbonyl sulfide from a second spent sieve by passing a heated desorbing gas selected from the group consisting of hydrogen and inert gases, said second sieve having an average pore diameter of about 3 Angstrom units, diverting said natural gas stream from said first sieve to said second sieve and desorbing the adsorbed carbonyl sulfide from said first sieve by passing heated gas selected from the group consisting of hydrogen and inert gases therethrough.

6. A continuous process for the removal of carbonyl sulfide from natural gas comprising heating a first molecular sieve having an average pore diameter of about 3 Angstrom units for a period of time and at a temperature sufficient to drive off the water of hydration therefrom, passing said natural gas through said sieve, heating a second molecular sieve having a pore diameter of about 3 Angstrom units for a period of time and at a temperature sufficient to drive off the water of hydration therefrom, determining by means of chromatographic analysis the carbonyl sulfide content of said natural gas issuing from said first sieve, diverting in response to said chromatographic analysis said gas stream from said first sieve to said second sieve, desorbing the adsorbed carbonyl from said first sieve by passing heated gases therethrough.

7. A process for the removal of carbonyl sulfide from natural gas wherein natural gas containing carbonyl sulfide and carbon dioxide is to be used in an ammonium plant comprising heating a molecular sieve having an average pore diameter of about 3 Angstrom units to a temperature of about 500° F. for about 16 hours, passing the natural gas through the sieve at a contacting temperature ranging from about 70 to about 200° F., and at a contacting pressure ranging from atmospheric to about 600 p.s.i.g., to adsorb said carbonyl sulfide and render said natural gas stream substantially free of carbonyl sulfide.

8. A process for the removal of carbonyl sulfide from natural gas comprising passing the natural gas through a molecular sieve having an average pore diameter of about 3 Angstrom units whereby the carbonyl sulfide is adsorbed, measuring the carbonyl sulfide content of the gas effluent from said molecular sieve, and stopping said passing when said content reaches a predetermined level.

9. A process for the removal of carbonyl sulfide from natural gas comprising passing the natural gas through a molecular sieve having an average pore diameter of about 3 Angstrom units whereby the carbonyl sulfide is adsorbed on said molecular sieve, and subsequently regenerating said molecular sieve by passing a regenerating gas selected from the group consisting of hydrogen and inert gases therethrough whereby said carbonyl sulfide is desorbed from said molecular sieve.

10. The process of claim 9 wherein said regenerating gas is stripped of said carbonyl sulfide and reused for further regeneration of said molecular sieve.

11. A process for the removal of carbonyl sulfide from natural gas comprising passing the natural gas through a molecular sieve consisting of potassium zeolite and sodium zeolite in a ratio of 3:1 to adsorb said carbonyl sulfide.

References Cited
UNITED STATES PATENTS
3,085,380 4/1963 Dillman et al. _____ 55—73 X
3,208,230 9/1965 Fourroux _____ 55—67 X

OTHER REFERENCES
Barrer, R. M.: Separation of Mixtures Using Zeolites as Molecular Sieves, Part I, J. Soc. Chem. Ind., vol 64, pp. 130–135, May 1945.

Breck et al.: Crystalline Zeolites I: The Properties of a New Synthetic Type Zeolites, type A, In Journal of the American Chemical Society 78 (23), pp. 5963–5070. Dec. 8, 1956.

Jones, Robert: Molecular Sieves, In Advance In Petroleum Refining, vol. IV, pp. 115–161, November 1961, pages 126 and 143–146 relied on.

Mitchell, Tom: How Chromatography Can Improve Gasoline Plant Profits, In The Oil and Gas Journal. vol. 58, No. 2, January 1960, pages 73 to 75.

REUBEN FRIEDMAN, *Primary Examiner.*

J. ADEE, *Assistant Examiner.*